United States Patent Office 2,699,362
Patented Jan. 11, 1955

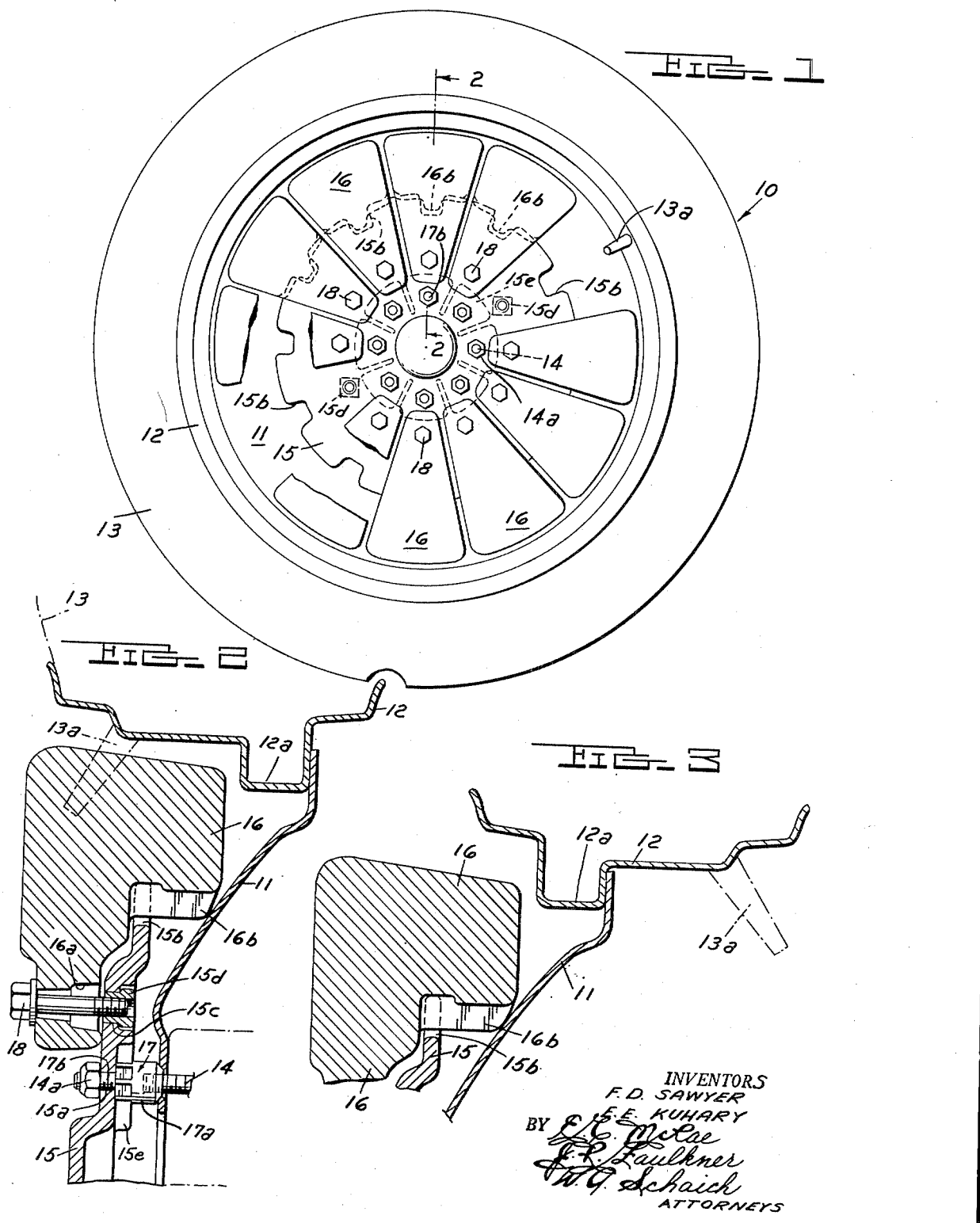

2,699,362
REAR WHEEL WEIGHTS FOR TRACTORS

Frederick D. Sawyer, Birmingham, and Emery E. Kuhary, Royal Oak, Mich., assignors to Ford Motor Company, Dearborn, Mich., a corporation of Delaware Application December 29, 1953, Serial No. 400,876

2 Claims. (Cl. 301—41)

This invention relates to detachable wheel weights for the traction wheels of farm tractors. In a more specific aspect this invention relates to an improved weight set for the traction wheels of farm tractors, which weights by virtue of their multi-segmental construction, provide an adjustable range of weights to be added to said traction wheels.

Tractor wheel weights which have heretofore been used have generally been in the form of heavy rings of cast iron which often weigh from 100 to 300 pounds or more. When it is considered that such weights must be supported in an elevated position while they are being bolted in place, it is readily realized that the installation of such weights requires excessive manual effort.

It is therefore an important object of the present invention to provide novel wheel weights for the drive wheels of traction vehicles. It is a further object of the present invention to provide improved, multi-piece wheel weights for the traction wheels of farm tractors and the like wherein each weight piece may be conveniently attached to, or detached from, the tractor wheel. A still further object of the present invention is to provide improved multi-piece wheel weights which provide a selective range of weight for addition to the traction wheels of farm tractors.

The specific nature of this invention, as well as other objects and advantages thereof, will become apparent to those skilled in the art from the following detailed description taken in conjunction with the attached drawings on which, by way of preferred example only, is illustrated one embodiment of this invention.

On the drawings:

Figure 1 is a side view of the drive wheel of a farm tractor of well known make, showing a wheel weight set made in accordance with the present invention installed thereon.

Figure 2 is a sectional view taken along the plane 2—2 of Figure 1.

Figure 3 is a sectional view similar to Figure 2, showing the wheel rim in a reversed position from Figure 2.

As shown on the drawings:

In Figure 1 the numeral 10 refers generally to a tractor rear wheel assembly, which includes a wheel disc 11 upon which is bolted a rim 12. A pneumatic tire 13 is mounted upon rim 12 in a conventional manner. The wheel assembly 10 is attached to the wheel hub by means of a ring of threaded studs 14 projecting from the said hub, which studs pass through a ring of bolt holes formed around the center of disc 11. Hex nuts are normally threaded on studs 14 to secure the disc 11 in place. The present multi-piece weight set includes a circular hub 15 upon which plurality of segmental weights 16 are selectively mounted. The hub 15 is attached to disc 11 and the tractor axle by the ring of the studs 14 and stud extensions 17.

Each stud extension 17 includes an enlarged, generally cylindrical spacer portion 17a and a threaded stud portion 17b. The spacer portion 17a is provided with a hexagonal shouldered portion for the reception of a wrench, and a coaxial, threaded bore whereby it can be threaded on a stud 14, thus substituting for the usual nut, to hold the wheel disc 11 in its normal position on the wheel hub. The threaded stud portions 17b project through a ring of bolt holes 15a formed around the center of said weight hub 15. The conventional wheel disc nuts 14a are threaded on stud portion 17b to thereby secure hub 15 to disc 11 in an outwardly spaced relation thereto.

Weight hub 15, as shown in Figure 1, is of dish-shaped configuration and has a series of circumferentially spaced, U-shaped notches 15b formed on the periphery thereof. The hub 15 of the particular weight set shown has twelve such notches 15a. A corresponding number of segmental weights 16, are provided which are attachable to said hub and which are indexed in a desired relationship to each other by said notches. Of course, it will be obvious that a greater or lesser number of notches can be provided in the periphery of disc 15 with a corresponding increase or decrease in the number of weight segments employed.

Weight hub 15 is also provided with a ring of bolt holes 15c which are spaced outwardly a short distance from holes 15a. The holes 15c correspond in number to the notches 15a and each of said holes is radially aligned with one of the notches 15a. Each of the holes 15c is fitted with a hardened steel, interiorly threaded, sleeve insert 15a. As shown in dotted outline in Figure 1, the headed portions of inserts 15d are square and fit into square counterbore recesses forming parts of holes 15c, on the inside of hub 15. It will be obvious that the square heads and square recesses provide abutting, non-cylindrical surfaces which prevent the sleeve 15d from turning when the weight attaching bolts 18 are turned thereinto. The hardened inserts 15d are provided since the hub 11 will preferably be fabricated of malleable iron which is too soft to retain sharp threads. The inserts spread the bolting stresses over a larger area of the hub 11 than would a threaded hole, and thus prevent fracture of hub 11 by high bolting pressures. As shown in Figure 1 by the dotted outline, the inner side of weight hub 15 is provided with a series of reinforcing ribs 15e to better absorb the bolting stresses encountered, and generally strengthen said hub.

The weights 16 are sector-shaped segments of a circle, as viewed in Figure 1. When all 12 weights are fitted in the hub 15, they form a full circle of balanced weight. The weights 16 are each provided at their inner ends with holes 16a for the reception of an attaching bolt 18, previously mentioned. The outer end of each of the weights 16 is provided with a centrally located rib 16b which engages in the adjacent one of the notches 15b of weight hub 15 to index said weights into proper relationship with each other. The upper end of each weight 16 projects inwardly over the hub 15 and extends toward the wheel disc 11. In this manner the weight of the assembled unit is retained close to the wheel disc 11, thus maintaining the balance of the vehicle.

In the traction wheel illustrated, the rim 12 has an off-center channel 12a, which is adapted to be bolted to disc 11. As shown in Figures 2 and 3, varying wheel spacings can be effected by selecting the axial position of the wheel rim 12 with respect to the wheel disc 11. In the mounting shown in Figure 1, the tire valve stem 13a projects outwardly. Therefore a wheel weight is omitted to clear the valve stem. To maintain a balanced wheel, the opposite weight is also preferably omitted. In the mounting shown in Figure 3, the valve stem is on the inside of the wheel, and thus, up to a complete ring of weights can be applied. In an exemplary embodiment, the hub weighs approximately 35 pounds and each weight segment weighs approximately 44 pounds. Such weight set thus provides a range of weights from 35 to 564 pounds per wheel. To keep the wheel in balance, two weights are preferably added at a time, directly opposite each other. Thus the hub and two weights add 123 pounds to the wheel. Increasing increments of 88 pounds can be added as desired, for balanced wheel operation.

The advantages of the present wheel weights will be readily apparent to those skilled in the art. For example, the heaviest object which need be handled during their installation is a 44 pound weight, and only a wrench is needed to apply the weight hub and weights to the wheel. In assembling the weight hub 15 to the wheel, a hex nut 14a is first removed from the stud 14 and a spacer assembly 17 is substituted therefor. This procedure is repeated around the ring of wheel attaching studs 14 without disturbing or requiring the removal of the wheel disc 11 from the wheel hub. The weight hub 15 is then fitted over the threaded stud portions 17b and is secured in place by applying the hex nuts 14a. The weights, one at a time are then conveniently lifted into an index notch and a fastening bolt 18 is quickly and easily applied. If a weight is applied at the top of hub 15, little holding is required while the bolts 18 are secured since the weight rests in the notch 15a. Thus two or three weights are applied at the top of the wheel, the tractor is then moved to bring more vacant notches 15a to the top of the wheel, and weight installation is repeated. Thus it is readily seen that the present wheel weights are easy to install, by virtue of their segmental construction, and the cooperation of the ribs 16b with the notches 15b prevents inadvertent angular shifting of the weight segments.

It will, of course, be understood that various details of construction may be varied through a wide range without departing from the principles of this invention and it is, therefore, not the purpose to limit the patent granted hereon otherwise than necessitated by the scope of the appended claims.

We claim:

1. For use with a traction vehicle having a wheel hub and a ring of bolts on said hub and a wheel assembly supported by said bolts, the improvement of a multiple unit wheel weight including a circular weight hub and means for attaching said weight hub to said wheel hub bolts in coaxial alignment with said wheel, said weight hub having a plurality of circumferentially spaced indexing recesses formed on the periphery thereof, and a ring of bolt receiving apertures formed between the center and periphery of said weight hub, said apertures corresponding in number to said notches, a plurality of sector-shaped weights, each of said weights having a centrally disposed rib formed on its outer portion for engagement with one of said indexing recesses, and bolt means for attaching any selected number of said weights to said hub member in a circular array, traversing said apertures and said weights whereby a range of weight increments can be added to said traction wheel.

2. The combination defined in claim 1 wherein an internally threaded hollow plug is inserted in each of said apertures, said apertures and said plugs having abutting non-cylindrical surfaces cooperating to prevent rotation of said plugs relative to said weight hub.

References Cited in the file of this patent

UNITED STATES PATENTS 1,589,915     Whitehead _____ June 22, 1926

FOREIGN PATENTS 105,825     Austria _____ Jan. 22, 1926